(12) United States Patent
Fong et al.

(10) Patent No.: US 6,946,776 B2
(45) Date of Patent: Sep. 20, 2005

(54) METHOD AND APPARATUS FOR MAINTAINING A LIQUID METAL SWITCH IN A READY-TO-SWITCH CONDITION

(75) Inventors: Arthur Fong, Colorado Springs, CO (US); Marvin Glenn Wong, Woodland Park, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 172 days.

(21) Appl. No.: 10/413,002

(22) Filed: Apr. 14, 2003

(65) Prior Publication Data

US 2004/0201330 A1 Oct. 14, 2004

(51) Int. Cl.[7] .......................... H01L 41/08; H01H 29/00; G02F 1/295; H02N 2/00
(52) U.S. Cl. .................... 310/328; 310/26; 200/182; 200/187; 200/188; 200/189; 200/211; 200/212; 200/214; 200/215; 200/219; 335/47; 335/49; 335/51; 335/58; 385/9; 385/147
(58) Field of Search .................... 310/36, 306, 328; 200/182, 187–189, 211, 212, 214, 215, 219; 335/47, 49, 51, 58; 385/9, 147

(56) References Cited

U.S. PATENT DOCUMENTS

| 6,323,447 | B1 | 11/2001 | Kondoh et al. | |
|---|---|---|---|---|
| 6,373,356 | B1 | 4/2002 | Gutierrez et al. | |
| 6,512,322 | B1 | 1/2003 | Fong et al. | |
| 6,515,404 | B1 | 2/2003 | Wong | |
| 2004/0201310 | A1 | * 10/2004 | Wong et al. | 310/328 |
| 2004/0201329 | A1 | * 10/2004 | Wong et al. | 310/365 |

FOREIGN PATENT DOCUMENTS

| EP | 0593836 A1 | 10/1992 |
|---|---|---|
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–No.: NB8406827, Cross Reference: 0018–8689–27–1B–827.

Kim, Joonwon et al. "A Micromechanical Switch with Electrostatically Driven Liquid–Metal Droplet." Sensors and Actuators, A: Physical. v 9798, Apr. 1, 2002, 4 pages.

Jonathan Simon, "A Liquid–Filled Microrelay with a Moving Mercury Microdrop" (Sep. 1997) Journal of Microelectromechanical Systems, vol. 6, No. 3, pp208–216.

Marvin Glenn Wong, "A Piezoelectrically Actuated Liquid Metal Switch"; filed May 1, 2002, U.S. Appl. No. 10/137,691, 12 pages of specification, 5 pages of claims, 1 page of abstract, and 10 sheets of drawings (Figs. 1–10).

* cited by examiner

Primary Examiner—Thomas M. Dougherty

(57) ABSTRACT

A method and apparatus for maintaining a liquid metal switch in a state of readiness for switching. The liquid metal switch has a liquid metal volume contained in a cavity of a switch body. A signal path though the cavity is made or broken by energizing an actuator to move the liquid metal volume within the cavity in response to a switching signal. To maintain readiness, a signal generator supplies a vibratory signal to the actuator. The resulting vibrations in the liquid metal volume allow the liquid metal volume to be subsequently moved with reduced power.

21 Claims, 3 Drawing Sheets

METHOD AND APPARATUS FOR MAINTAINING A LIQUID METAL SWITCH IN A READY-TO-SWITCH CONDITION

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of electrical and optical switching and, in particular, to switches that use liquid metal as part of the switching mechanism.

BACKGROUND OF THE INVENTION

Liquid metals, such as mercury, have been used in switches to provide an electrical path between two conductors. An example is a mercury thermostat switch, in which a bimetal strip coil reacts to temperature and alters the angle of an elongated cavity containing mercury. The mercury in the cavity forms a single droplet due to high surface tension. Gravity moves the mercury droplet to the end containing electrical contacts or to the other end, depending upon the angle of the cavity. In a manual switch, a permanent magnet is used to move a mercury droplet in a cavity and bring it into contact with electrical contacts.

Liquid metal is also used in relays. A liquid metal droplet can be moved by a variety of techniques, including electrostatic and electromagnetic forces, variable geometry due to thermal expansion/contraction, and magneto-hydrodynamic forces.

Rapid switching of high currents is used in a large variety of devices, but provides a problem for solid contact based relays because of arcing when current flow is disrupted. The arcing causes damage to the contacts and degrades their conductivity due to pitting of the electrode surfaces. Liquid metal switches can overcome this problem.

Micro-electromechanical (MEM) systems also utilize liquid metal switching. When the dimension of interest shrinks, the surface tension of the liquid metal becomes dominant force over other forces, such as body forces (inertia). Latching switches are described in the co-pending patent applications that use liquid metal as the part that causes the electrical or optical signal to be routed in one path, blocked or routed in another path. Sometimes the use characteristic of these switches requires them to be actuated with higher than normal switching energies to move the liquid metal from one location to another after the switch-state has remained unchanged for several minutes. This phenomenon is called "kick-starting". Kick starting is undesirable because it requires the use of at least two different switch drive energies, as well as keeping track of the time since the switch-state was last changed. Alternatively, repeated attempts to change the state of the switch must be made until a signal is received that the switch-state has been changed successfully. Both of these processes add complexity and waste switching time.

SUMMARY

A method and apparatus for maintaining a liquid metal switch in a state of readiness for switching. The liquid metal switch has a liquid metal volume contained in a cavity of a switch body. A signal path though the cavity is made or broken by energizing an actuator to move the liquid metal volume within the cavity in response to a switching signal. To maintain readiness, a signal generator supplies a vibratory signal to the actuator. The resulting vibrations in the liquid metal volume allow the liquid metal volume to be subsequently moved with reduced power.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
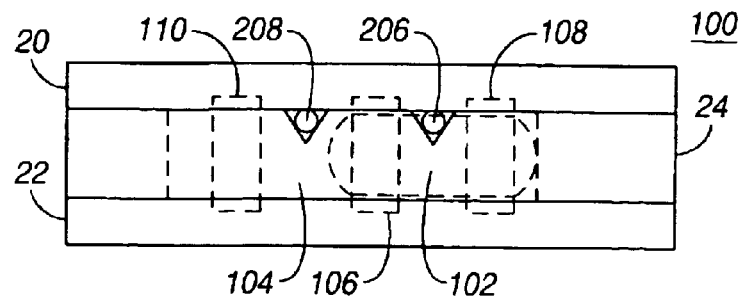
FIG. 1 is a side view of an exemplary liquid metal optical switch.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to liquid metal switches. A liquid metal switch uses an actuator, acting on a liquid metal volume, to change the switch-state of the switch. In the present invention, a constant or intermittent vibration is generated in the liquid metal. This causes the liquid metal to be agitated in a manner similar to that occurring when the switch-state is changed, thereby eliminating the need for "kick starting" or repeated attempts to switch.

The constant or intermittent vibration is generated in response to a vibratory drive signal that can be superposed with the normal drive signal. This requires little circuitry or logic compared with "kick-starting" or other approaches.

In the case where the drive elements are piezoelectric elements, the vibratory drive signal can consume very little power because of the capacitive nature of the piezoelectric elements.

FIGS. 1–6 show exemplary liquid metal switches. FIG. 1 is a side view of an exemplary optical switch. The switch 100 comprises a top cap layer 20, a bottom cap layer 22 and a switching layer 24. Optical waveguides 206 and 208 transmit optical signals to a cavity 104 in the switching layer. A liquid metal volume 102 is moveable within the cavity 104 to block the optical path from waveguide 206 or 208. Motion of the liquid metal volume is resisted by surface tension bonds to wettable contacts 106, 108 and 110. The liquid metal volume may be moved by pressure in an actuation fluid, by electromagnetic forces or by direct mechanical forces.

Figure 2:
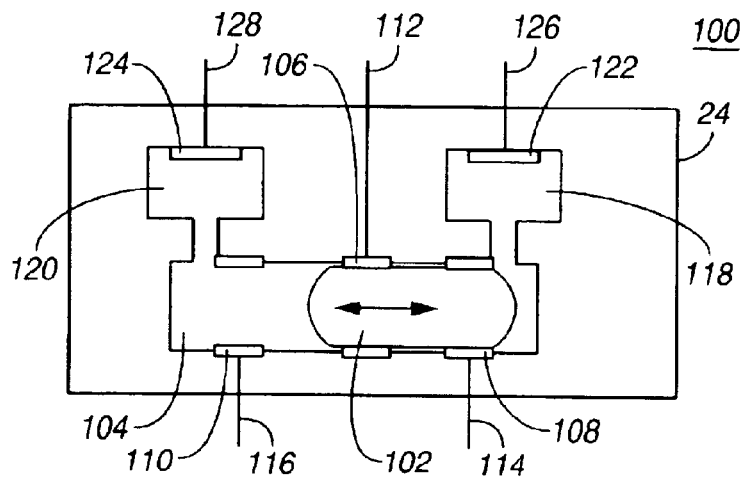
FIG. 2 is a top view of an exemplary liquid metal electrical switch.

FIG. 2 is a top view of the switching layer 24 of an exemplary liquid metal switch 100 in accordance with a first embodiment of the present invention. The switch includes a liquid metal volume 102 contained in a cavity 104. The cavity is formed in the body of the switch. In addition to the liquid metal volume 102, the cavity 104 contains an actuation fluid. Electrically conductive contacts 106, 108 and 110 are located in the cavity 104. In the figure, the liquid metal volume 102 provides an electrical signal path between contacts 106 and 108, while the electrical path between contacts 106 and 110 is broken. The liquid metal volume can be moved within the cavity so that the electrical path between contacts 106 and 110 is completed, while the path between contacts 106 and 108 is broken. In this manner, signals attached to the contacts via conductors 112, 114 and 116 can be blocked or routed through the switch. Other embodiments, using two or more contacts, will be apparent to those of ordinary skill in the art. A variety of actuation methods may be used to move the liquid metal volume. In FIG. 2 the liquid metal volume is moved by creating a pressure difference across the liquid metal volume. Fluid reservoirs 118 and 120 contain actuators 122 and 124. These may be heaters or volumetric actuators, such as piezoelectric elements. A heater may be used to heat a gas or to induce a phase change in a liquid, which increases the pressure in reservoir 118. An increase in the volume of a piezoelectric element results in a decrease the volume of the reservoir, which increases the pressure. The increased pressure acts on the liquid metal volume and moves it towards contact 110, breaking the electrical connection with contact 108. In one embodiment, the contacts 106, 108 and 110 have surfaces that are wettable by the liquid metal. The surface tension associated with the wetting action holds the liquid metal volume in the desired position, making the switch more robust against motion.

Figure 3:
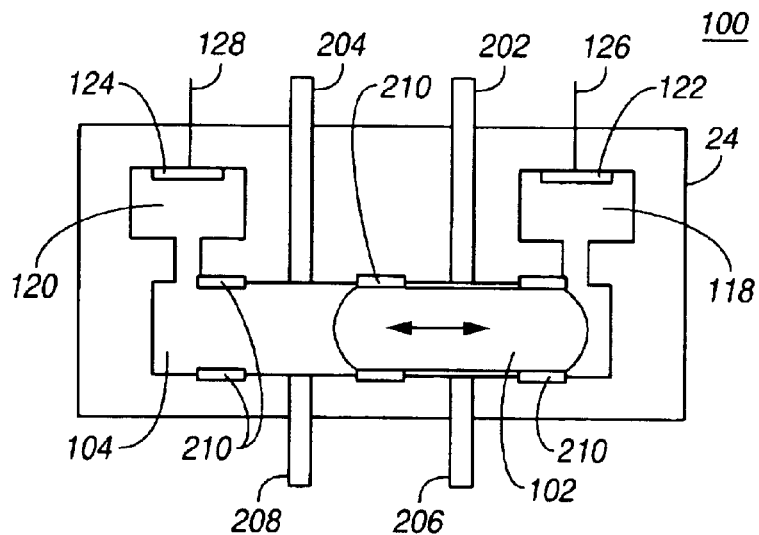
FIG. 3 is a top view of a liquid metal optical switch.

A similar arrangement may be used to switch optical signals. FIG. 3 shows a liquid metal optical switch. The structure and operation of the switch as the same as described above, except that the electrical conductors are replaced by optical waveguides 202, 204, 206 and 208. In the configuration shown in FIG. 3, an optical path is completed between waveguide 204 and waveguide 208, since the fluid in the cavity 104 is transparent. The optical path between waveguide 202 and waveguide 206 is broken or incomplete, since the liquid metal 102 is opaque. In the one embodiment, the contacts 210 have surfaces that are wettable by the liquid metal. The surface tension associated with the wetting action holds the liquid metal volume in the desired position, making the switch more robust against motion.

Figure 4:
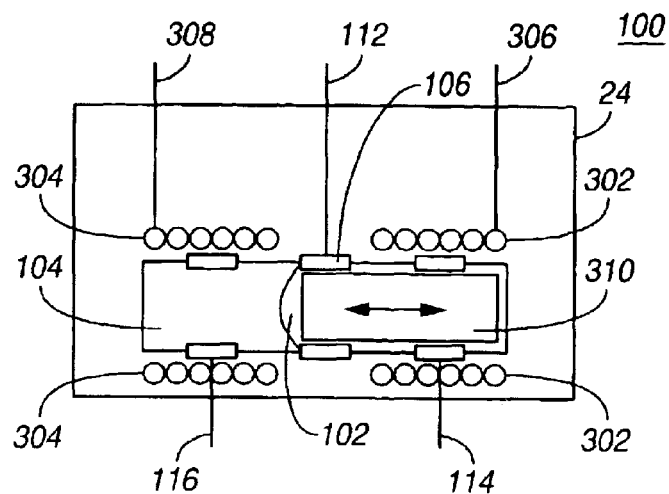
FIG. 4 is a top view of a further liquid metal electrical switch.

A further embodiment of a liquid metal switch is shown in FIG. 4. In this embodiment, electrical coils 302 and 304 may be energized to produce a magnetic field in the cavity 104. A solid magnetic slug 310 is wetted by liquid metal 102 and is moveable within the cavity 104. Energizing coil 304 will attract the solid magnetic slug 310 to contact 116, while energizing coil 302 will attract the solid magnetic slug to contact 114. The coils are actuated by electrical signals passed along conductors 306 and 308. A similar arrangement may be used to construct an optical switch.

Figure 5:
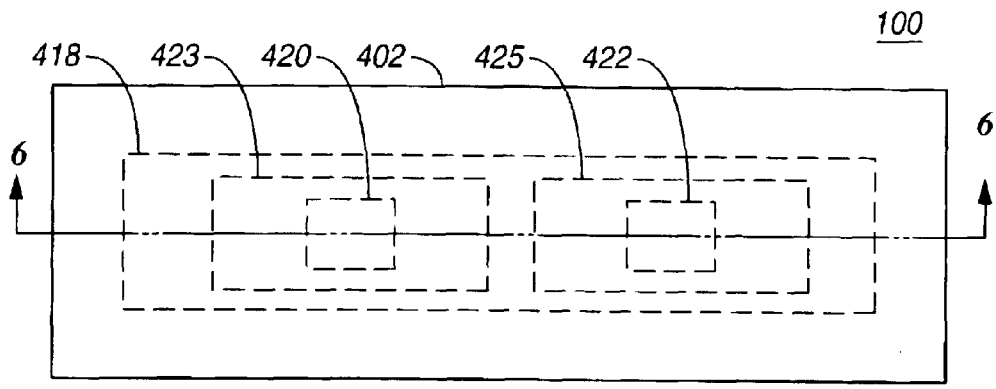
FIG. 5 is a top of a piezoelectric liquid metal switch.

A top view of a further embodiment of a liquid metal switch 100 is shown in FIG. 5. In this embodiment, piezoelectric actuators 420 and 422 in cavity 418 are energized to control the pressure of an actuation fluid in chambers 423 and 425. The actuation fluid, in turn, moves the liquid metal volume.

Figure 6:
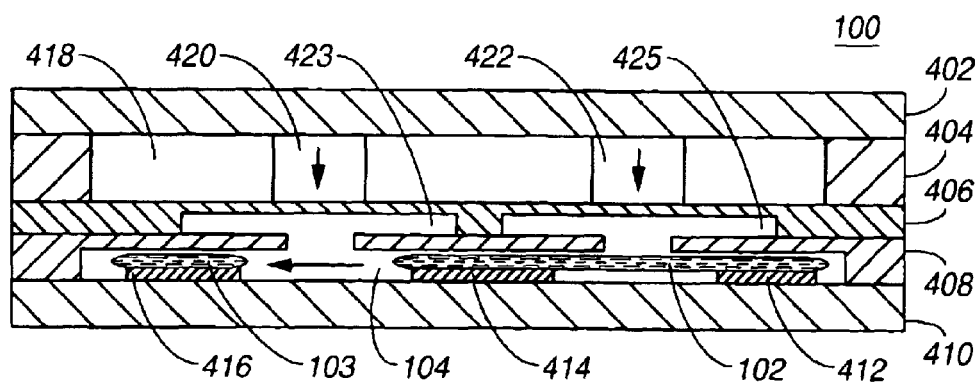
FIG. 6 is a sectional of a piezoelectric liquid metal switch.

FIG. 6 is a sectional view through the section 6—6 of the relay shown in FIG. 5. In this embodiment, the switch comprises a cover 402, an actuator layer 404, a diaphragm 406, a cavity layer 408 and a base 410. This layered structure is suitable for construction using micro-machining. The liquid metal volume in cavity 104 is separated into two smaller volumes 102 and 103. The remainder of the cavity 104 is filled with an inert, electrically non-conducting fluid. The cavity also contains contacts 412, 414 and 416. The amount and location of the liquid metal is such that two contacts are connected at a time. Second cavity 418 houses piezoelectric actuators 420 and 422. In operation, actuator 422 is extended in the direction of the arrow and deforms a flexible diaphragm 406. At the same time, piezoelectric actuator 420 may be contracted. The resulting downward force on the liquid metal volume 102, breaks the volume into two smaller volumes, one of which is moved towards liquid metal volume 103 and coalesces with it. As a result, the electrical path between contacts 412 and 414 is broken, while the electrical path between contacts 414 and 416 is completed. The operation may be reversed to return the switch to its original state. It will be apparent to those of ordinary skill in the art that a similar apparatus may be used for optical switching and that many other variations are possible.

Figure 7:
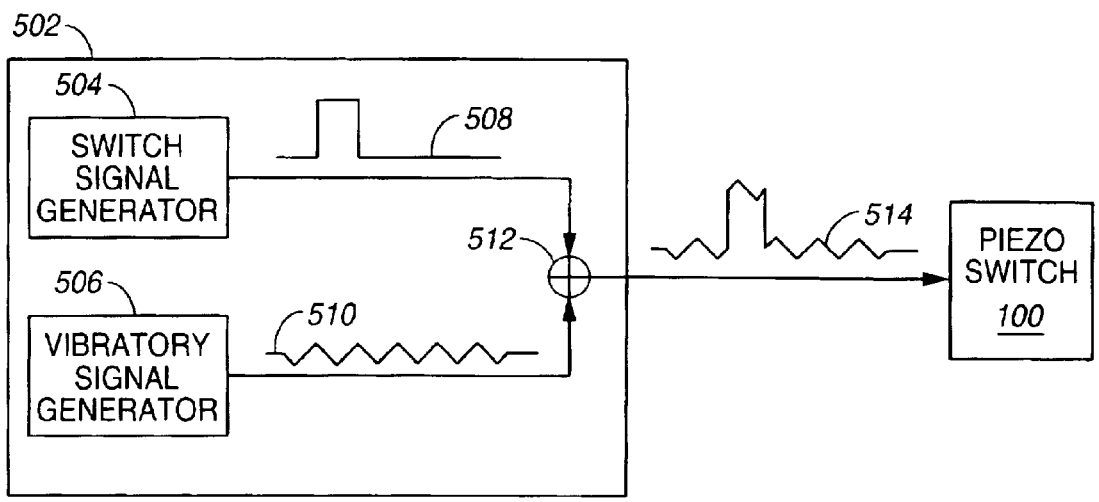
FIG. 7 is a diagrammatic representation of a system in accordance with certain embodiments of the present invention.

A common aspect of the liquid metal switches described above is that a liquid metal volume is used to make or break one or more signal paths through the switch. The energy efficiency of such a switch depends, in large part, on the amount of force required to move the liquid metal volume. The properties of liquid metal are such that the liquid metal becomes more difficult to move if the metal is not agitated for a period of time. This may happen, for example, if the switch-state is not changed for several minutes. The present invention provides a method and apparatus for maintaining a liquid metal switch in a state of readiness to switch. An embodiment of the invention is shown in FIG. 7. Referring to FIG. 7, a signal generator 502 includes both a switch signal generator 504 and a vibratory signal generator 506. In a further embodiment, the signal generators 504 and 506 may be separate units, but generally efficiency is gained by incorporating both the switch signal generator and the vibratory signal generator in a single unit. The switch signal generator 502 generates a short-duration switching signal 508 whenever a change of switch-state is required. This signal is of a high enough level that the liquid metal volume is moved from one location to another. The interval between state changes may be longer than several minutes in some applications. The vibratory signal generator 506 generates a vibratory signal 510. The vibratory signal may be a continuous signal, or an intermittent signal. If an intermittent signal is used, the pauses should be shorter than the time taken for the liquid metal to become more difficult to move. The switching signal and the vibratory signal are superposed at signal adder 512 to produce a combined signal 514. The combined signal 514 is passed to the actuator in the piezoelectric switch 100. In some switches multiple actuators are used, and so multiple signals may be required. For example, in an embodiment where two actuators are used, one signal may the inversion of the other. However, in a further embodiment, one actuator may be chosen to have the opposite polarity of the other so that a single signal may be used. The level of the vibratory signal should be sufficient to maintain the liquid metal in a ready-to-switch state. This level is generally much below the peak level of the switch signal.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for operating a liquid metal switch, the method comprising:
   vibrating a liquid metal volume within the switch in response to vibratory signal supplied to an actuator acting on the liquid metal volume, whereby the switch is maintained in a state of readiness; and
   moving the liquid metal volume in response to a switching signal supplied to the actuator so as to make or break a signal path through the switch.

2. A method in accordance with claim 1, further comprising combining the vibratory signal and the switching signal before supplying them to the actuator.

3. A method in accordance with claim 1, wherein moving the liquid metal volume comprises creating a pressure change within a cavity containing the liquid metal volume so as to create a pressure difference across the liquid metal volume.

4. A method in accordance with claim 2, wherein the pressure change is created by heating a gas in the cavity.

5. A method in accordance with claim 2, wherein the pressure change is created by heating a liquid in the cavity so as to cause the liquid to change state.

6. A method in accordance with claim 2, wherein the pressure change is created by altering the volume of the cavity.

7. A method in accordance with claim 6, wherein the cavity is bounded at least in part by a diaphragm and volume of the cavity is changed by deforming the diaphragm.

8. A method in accordance with claim 7, wherein the actuator is a piezoelectric element acting on the diaphragm.

9. A method in accordance with claim 1, wherein moving the liquid metal volume comprises generating an electromagnetic field in a cavity containing the liquid metal volume.

10. A method in accordance with claim 1, wherein electromagnetic field is generated using an electrical coil surrounding the cavity.

11. A method in accordance with claim 1, wherein the vibratory signal is supplied intermittently.

12. A method in accordance with claim 1, wherein the vibratory signal is supplied continuously.

13. A method in accordance with claim 1, wherein the signal path is an electrical path completed by moving the liquid metal volume into the electrical path.

14. A method in accordance with claim 1, wherein the signal path is an optical path broken by moving the liquid metal volume into the optical path.

15. A liquid metal switch comprising:
    a switch body having a cavity therein;
    a liquid metal volume contained in the cavity;
    an actuator operable to make or break a signal path though the cavity by moving the liquid metal volume within the cavity in response to a switching signal; and
    a signal generator electrically coupled to the actuator and operable to supply a vibratory signal to the actuator, thereby maintaining the switch in a state of readiness.

16. A liquid metal switch in accordance with claim 15, wherein the actuator is operable to produce a pressure change within the cavity so as to create a pressure difference across the liquid metal volume.

17. A liquid metal switch in accordance with claim 16, wherein the actuator is a heater.

18. A liquid metal switch in accordance with claim 16, wherein the actuator is a piezoelectric element.

19. A liquid metal switch in accordance with claim 15, wherein the cavity is bounded at least in part by a diaphragm and volume of the cavity is changed by deforming the diaphragm.

20. A liquid metal switch in accordance with claim 19, wherein the actuator is a piezoelectric element acting on the diaphragm.

21. A liquid metal switch in accordance with claim 15, wherein the actuator is an electric coil operable to generate an electromagnetic field in the cavity.

* * * * *